(12) United States Patent
Arnold et al.

(10) Patent No.: US 7,669,734 B2
(45) Date of Patent: Mar. 2, 2010

(54) DOSING SYSTEMS FOR FLUID MEDIA

(75) Inventors: Martin Arnold, Huefingen (DE); Guido Schmid, Triberg (DE)

(73) Assignee: Minebea Co., Ltd., Nagano-ken (JP)

( * ) Notice: Subject to any disclaimer, the term of this patent is extended or adjusted under 35 U.S.C. 154(b) by 1177 days.

(21) Appl. No.: 11/247,577

(22) Filed: Oct. 11, 2005

(65) Prior Publication Data
US 2006/0089749 A1  Apr. 27, 2006

(30) Foreign Application Priority Data
Oct. 21, 2004  (DE) ........................ 10 2004 051 537

(51) Int. Cl.
*B67D 5/08* (2006.01)
(52) U.S. Cl. ............................. 222/59; 222/1; 222/14
(58) Field of Classification Search .................. 222/47, 222/20, 40, 1, 14, 52–69, 71–73; 700/240
See application file for complete search history.

(56) References Cited

U.S. PATENT DOCUMENTS

| | | | | |
|---|---|---|---|---|
| 4,315,523 A | * | 2/1982 | Mahawili et al. | 137/486 |
| 4,876,653 A | * | 10/1989 | McSpadden et al. | 700/239 |
| 5,739,429 A | | 4/1998 | Schmitkons et al. | 73/196 |
| 6,097,993 A | * | 8/2000 | Skupin et al. | 700/240 |
| 6,192,876 B1 | * | 2/2001 | Denyer et al. | 128/205.25 |
| 2003/0205229 A1 | * | 11/2003 | Crockford et al. | 128/204.23 |

FOREIGN PATENT DOCUMENTS

EP  0403280 A2  6/1990

* cited by examiner

*Primary Examiner*—Lien T Ngo
(74) *Attorney, Agent, or Firm*—Cooper & Dunham LLP

(57) ABSTRACT

A dosing system to dispense a predetermined quantity of a fluid medium comprises a digital signal processor control having an interface to emit a start signal and a stop signal and an interface to measure a sensor signal. A dispenser is provided that is triggered by the start signal and the stop signal and, in the interval between the two signals, dispenses a specific quantity of fluid, as well as a sensor unit which, triggered by the start signal, continuously measures the flow rate of the fluid fed to the dispenser and emits a sensor signal as a function of this flow rate. The digital signal processor control measures the sensor signal, determines the quantity of fluid dispensed by the dispenser from this signal and sends a stop signal to the dispenser when the quantity of fluid dispensed by the dispenser corresponds to the predetermined quantity of fluid.

24 Claims, 3 Drawing Sheets

DOSING SYSTEMS FOR FLUID MEDIA

BACKGROUND OF THE INVENTION

The invention relates to a dosing system for fluid media, particularly a micro-dosing system, hereafter also referred to as a micro-dispenser system according to the preamble of claim 1.

PRIOR ART

Various types of dosing systems, including in particular micro-dosers or micro-dispensers, are known. Using these commercial systems, fluid media, i.e. liquids and gases, can be dosed. Within the scope of the invention, free jet dispensers in particular will be considered. These free jet dispensers are based on different functional principles.

Drop dispensers have a glass capillary that is filled with a fluid and made to vibrate by means of one or more piezo elements, as a result of which they deliver a specific number of drops per unit of time.

Another type of free jet dispenser has a fine needle or capillary that is connected to a reservoir. The reservoir is filled with a fluid and is kept under pressure. A valve, taking the form, for instance, of a piezo element, opens and closes the feed line between the pressurized reservoir and the needle or capillary and allows the fluid to be dosed in droplets.

Again, other dosing systems operate according to the volume displacement principle ("spray principle"). To dispense the smallest amount of a fluid, these systems have a thin silicon membrane that is connected to a chamber filled with a fluid and incited using, for instance, an electrostatic or piezoelectric principle, which results in a defined amount of fluid being displaced from the chamber and released to the outside.

In the case of needle dispensers, a reservoir filled with fluid is set temporarily under pressure with the result that a specific amount of the fluid is dispensed through a thin needle point. This method is not very accurate and thus not as suitable for small quantities of fluid. The amount of fluid to be delivered is regulated by the pressure and the dosage time.

The drop dispensers described above dispense small individual drops of fluid at a specific frequency. To determine the overall quantity (volume) of the fluid dispensed, dosage tests have to be made to determine the average volume of a single drop. The overall quantity of fluid delivered can then be approximately determined from the number of drops dispensed. This means that a linear dependency between the number of drops and the overall quantity delivered is assumed.

In practice, however, it has been shown that, contrary to the assumption, a set linear relationship does not exist between the number of drops and the overall quantity dispensed. Certain deviations have been found which bear particular weight when the overall quantities to be dispensed are low. A large number of different effects, such as varying environmental, fluid or dosing head temperatures, the dosage rate, the pressure under which the fluid is held, the viscosity of the fluid etc. allow the amount delivered to vary greatly over time at a constant number of drops, making it necessary to continuously monitor the overall quantity and thus constantly adjust the number of drops accordingly, in order to always obtain a constant overall quantity.

All in all, we can describe this kind of drop dispensing as a controlled operation that cannot guarantee that the required dosage is delivered without consistent back checking.

SUMMARY OF THE INVENTION

It is thus the object of the invention to improve the dosing accuracy of commercially available dispensers of the kind described at the outset. At the same time, the dosing accuracy should be substantially independent of the dispenser employed.

This object has been achieved according to the invention by a dosing system having the characteristics outlined in patent claim 1. A dosing procedure that can be realized using this system is cited in claim 9.

Preferred embodiments of the invention and other advantageous characteristics of the invention are cited in the subordinate claims.

According to the invention, a high-precision flow rate sensor is inserted in the fluid path of an existing micro-dosing device. A micro-processor circuit is likewise added which has the task of evaluating the signals of the flow rate sensor and controlling the micro-dosing head. The amount of fluid delivered by the micro-dispenser is regulated as a function of a measured flow volume. Thus the invention involves a regulated dosage procedure in which the quantity delivered is continuously measured during the dosing process with the aid of a flow rate sensor, the dosing process not being terminated until the predetermined amount of fluid has been delivered.

Here, the dosing process is terminated shortly before the required overall quantity of fluid has been detected. It has been shown that after the micro-dispenser has been switched off, a certain overrun quantity is detected by the sensor although no more fluid leaves the dispenser. The amount of overrun depends not only on the overall construction of the dispenser system but also in particular on the dosage rate (flow rate) and has to be taken into account for the exact dosage of a predetermined amount. To this effect, the dosing process is ended according to the invention when the overall quantity, in other words the predetermined dosage quantity, less the accordingly determined overrun amount, has been attained.

Since it is the actual quantity of fluid delivered that is now regulated, the above-mentioned effects no longer have an influence on the quantity of fluid dispensed. Although the number of drops that are dispensed may vary, the overall quantity of the delivered fluid remains constant.

According to the invention, a commercial, high-precision flow rate sensor, based preferably on the calorimetric principle, is used. These sensors use differential temperature measurements to determine the flow rate. A heating element disposed in the fluid flow heats up the fluid locally. Temperature sensors disposed upstream and downstream measure the temperature distribution in the fluid, which is dependent on the flow rate of the fluid, on the temperature coefficient of the fluid as well as on the flow cross-section. In particular, these sensors are capable of detecting the flow rate in both flow directions. This is particularly important where line systems comprising soft hoses and compressible fluids are used, to the extent that a return flow of the fluid can occur which has to be ascertained so that the exact overall quantity of the fluid dispensed can be measured.

In principle, flow rate sensors based on the impeller principle or differential pressure sensors are also suitable within the scope of the invention, but only for larger flow volumes.

The digital signal processor control has the following tasks, among others. It is used to measure and integrate the flow rate (quantity or value per time) emitted by the flow rate sensor, e.g. as an analogue voltage, to continuously ascertain the overall quantity delivered by the system and to control the micro-dosing system which is dependent on this. The described micro-dosing system thus operates independently of the tolerance of the dosing head employed. The achievable accuracy is, for example, higher than 2% of the dispensed overall quantity. The digital signal processor control further recognizes any instances of failure, such as exceeding the permissible dispensing time or the permissible dosage (number of drops), or exceeding or falling short of other predetermined values. Another task of the control is to monitor the stability of the process to predict or recognize the state of the dosing head. While continuously measuring the amount of fluid dispensed, the digital signal processor control also takes account of any dead-time or overshoot effects of the fluid-carrying system which could distort the quantity of fluid delivered. This goes to prevent the dosing system being switched off too early or too late as a result of these effects. In particular, any air trapped in the medium to be dispensed can also be recognized and taken into account.

The system and procedure according to the invention enables fluids, including gases in particular, to be accurately dosed. At the same time, the control also allows for the dosage of fluids in closed systems, for example, for the dosage of components for medicines etc., particularly in closed loops.

There are many different possible fields of application for the invention. Micro-dosing procedures have medical applications, for instance to fill microtiter plates and micro-arrays for medical analysis, particularly in both cancer research and DNA sequencing.

Other applications include, for example, the micro-dosage of adhesives, particularly in mixing 2-component adhesives, which can either be mixed in the dosing needle or later on the object itself, in which latter case two independent dispensers are used.

In general, another application can be found in the provision of highly accurate mixing ratios of at least two components, particularly of low fluid quantities, such as of two or more component adhesives, paints or the mixture of enzymes with other medical substances etc.

Other applications include, for example, filling machines or fluid bearings with small amounts of lubricant or the specific application of oil-stop varnish on bearing parts to reduce the creeping effect of oil by reducing the surface tension of the oil on the varnish surface.

BRIEF DESCRIPTION OF THE DRAWINGS

The invention is described in more detail below on the basis of an embodiment with reference to the drawings.

DESCRIPTION OF A PREFERRED EMBODIMENT OF THE INVENTION

The integration of a dispenser according to the invention, in particular a simple, low-cost dispenser, and a flow rate sensor in a control loop, goes to create a high-precision dosing system. To ensure the greatest possible accuracy for the system, it is necessary to calibrate each flow rate sensor separately and also to calibrate the dosing system as a whole.

Figure 1:
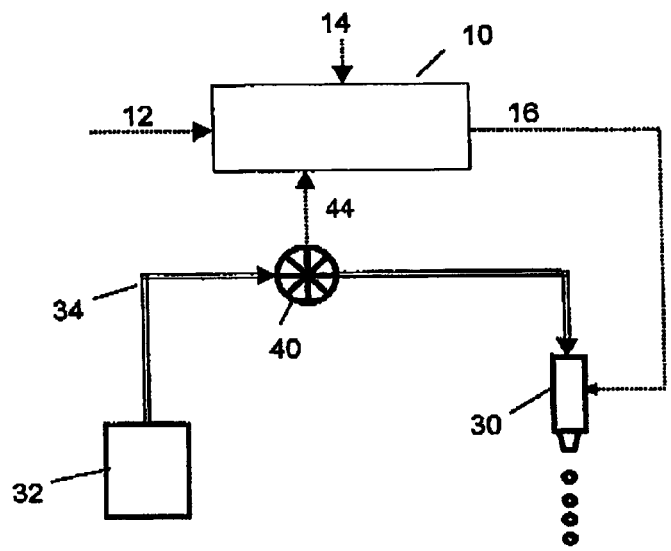
FIG. 1 schematically shows the basic construction of the dosing system according to the invention.

FIG. 1 shows the basic construction of the dosing system. The heart of the system is a control which can contain a digital signal processor control (DSP) or a micro-processor control 10 that regulates the dosing process. The dosing process can, for example, be triggered by an external start signal 12. The digital signal processor control 10 can be realized either as an independent discrete unit or by means of a personal computer and appropriate software.

A predetermined value 14 for the quantity of fluid to be dosed can be fed to the digital signal processor control 10 from outside or stored internally. The digital signal processor control 10 controls the operation of the actual dispenser 30, which generally comprises a unit of dosage and an electronic control unit, via a signal line 16. The fluid to be dispensed is fed from a reservoir 32 via a line system 34, flexible hose lines for example, to the dispenser 30. A flow rate sensor 42 is connected in the line system 34 as a part of a sensor unit 40, the flow rate sensor delivering an electric signal 44 to the digital signal processor control 10 as a function of the actual flow rate. The digital signal processor control 10 evaluates the signal 44 of the sensor 40, determines the actual flow rate from this and regulates the operation of the dispenser 30 as a function of the flow rate. When the predetermined quantity of fluid has been reached, the dispenser 30 is switched off.

The digital signal processor control 10 is preferably conceived such that it can regulate one or more sensor-dispenser control loops simultaneously and independent of each other.

Figure 2:
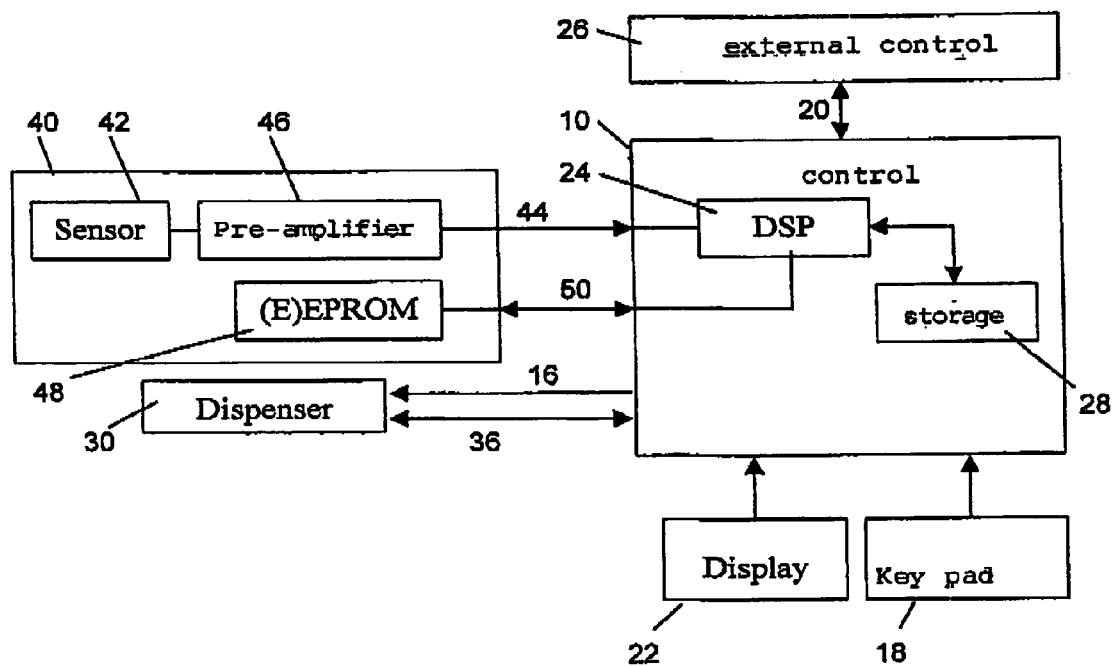
FIG. 2 shows, in comparison to FIG. 1, a detailed block diagram of the construction of the dosing system according to the invention.

As can be seen from FIG. 2, the digital signal processor control 10 receives its predetermined values and data either from an external, superordinate control 26, such as a PC, or, for example, through direct data entry via a key pad 18. It is further possible that the control 10 also delivers measured values to the superordinate control 26 via an analogue or digital interface 20 or data line. For the visualization of the input and output data, it is preferable if a display 22 is connected to the digital signal processor control 10 or to the superordinate control 26. The digital signal processor control 10 starts and stops the operation of the dispenser 30 by sending appropriate control signals 16 to the control unit of the dispenser. It can also provide the electronic control unit of the dispenser with other necessary parameters and values, such as temperature, dispensing/drop rate or with commands such as on/off, via an analogue or digital interface 36 or data lines.

The sensor unit 40 consists of the flow rate sensor 42, a pre-amplifier 46 to amplify the analogue output signals of the sensor 42 and preferably of a storage unit 48 (e.g. (E)EPROM), in which the calibration characteristic 52 of the sensor 42 is filed either as a truth table or in the form of a mathematical function.

The output signal 44 of the flow rate sensor 42 that is generally an analogue signal is preferably pre-amplified and fed to the digital signal processor control 10 via an analogue interface. The digital signal processor control 10 preferably comprises a DSP 24 (digital signal processor). From the signal 44 of the flow rate sensor 42, the flow rate, given by the weight or the volume per unit of time, is determined by the DSP 24 using the sensor characteristic 52 stored in the storage unit 48. When the system is started up, the data filed in the storage unit 48 is read out by the DSP 24 via a preferably bi-directional digital interface 50. When the sensor 42 is calibrated for the first time, this storage unit 48 is written by the DSP 24. At the same time, other data, such as the model number, the date of manufacture etc. can also be stored.

The determination of the actual flow rate by the digital signal processor control 10 is done within the shortest possible intervals of time according to a specific sampling rate. The overall flow volume of the fluid is subsequently determined by the integration of the individual measured values of the flow rate taking the sampling rate into account.

The digital signal processor control 10 further has a storage unit 28 in which, among other data, an overrun characteristic of the dosing system is filed which is read out by the DSP 24 when the system is started up. The overrun characteristic is described in more detail below.

Figure 5:
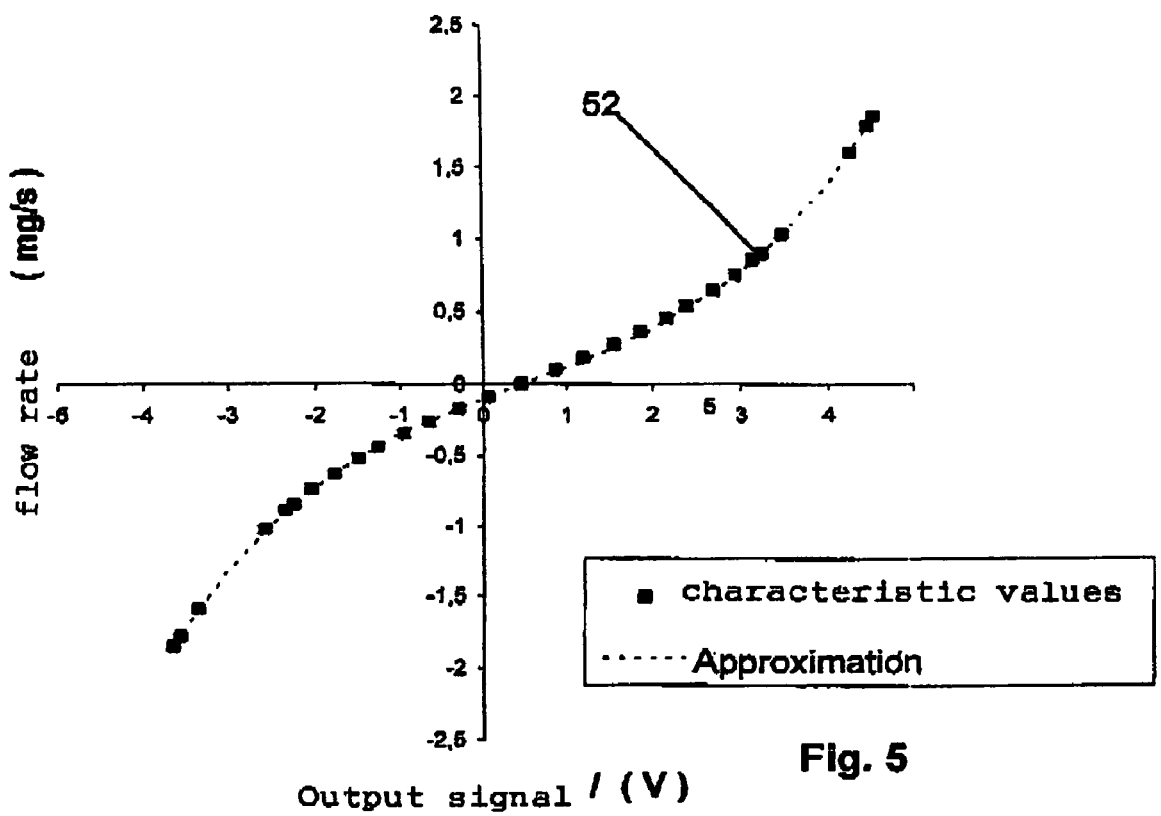
FIG. 5 is an exemplary graph of a characteristic curve of a typical flow rate sensor.
Figure 6:
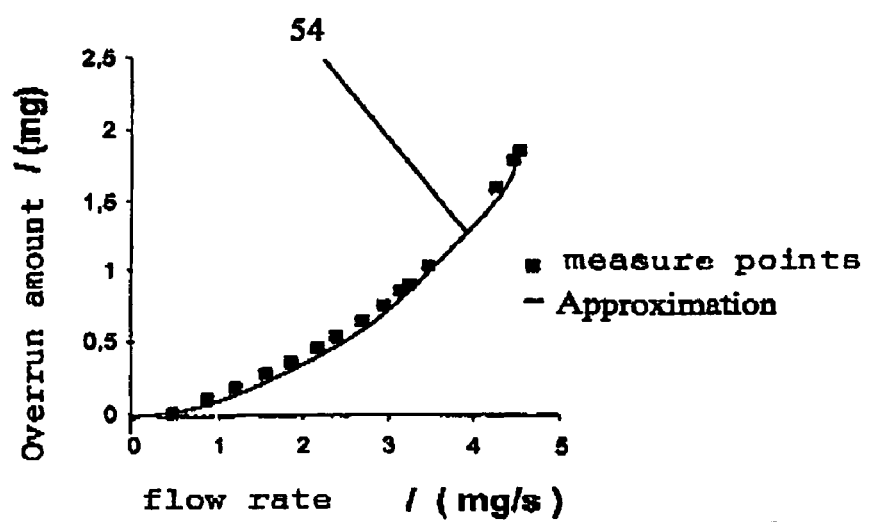
FIG. 6 shows an exemplary graph of an overrun characteristic of an exemplary dosing system.

The calibration curve or sensor characteristic 52 in FIG. 5 shows the interrelationship between the flow rate and the output signal 44 of the sensor 42 as well as an approximation through a polynomial of the third degree. The coefficients of this polynomial are dependent on the respective flow rate sensor. The sensor characteristic 52 to calibrate the sensor unit 40, in other words the waveform of the output voltage of the sensor 42 as a function of the flow rate, is determined by the most accurate reference measurement possible of the delivered quantity of fluid. Here, the sensor characteristic 52 depends in particular on the sensor 42 that is employed as well as on the fluid medium that is used. The reference measurement can be taken, for instance, by weighing the amount of fluid delivered, by determining the differential volume or by a previously adjusted sensor. This sensor characteristic 52 is then filed as a truth table or its approximation in the form of a mathematical equation in the storage unit 48 of the sensor unit 40 or the digital signal processor control (storage unit 28). Here, it has been shown that for flow rate sensors based on the differential temperature principle, the sensor characteristic 52 can be preferably approximated by a polynomial of the third order or by the sum of two exponential functions.

In addition, the DSP 24 makes an offset correction of the sensor characteristic 52. To this effect, after each system start-up or before each dosing process with the dispenser 30 switched off, the offset voltage $U_{off}$ (zero line) of the sensor signal 44 is determined (see also FIG. 3).

Figure 3:
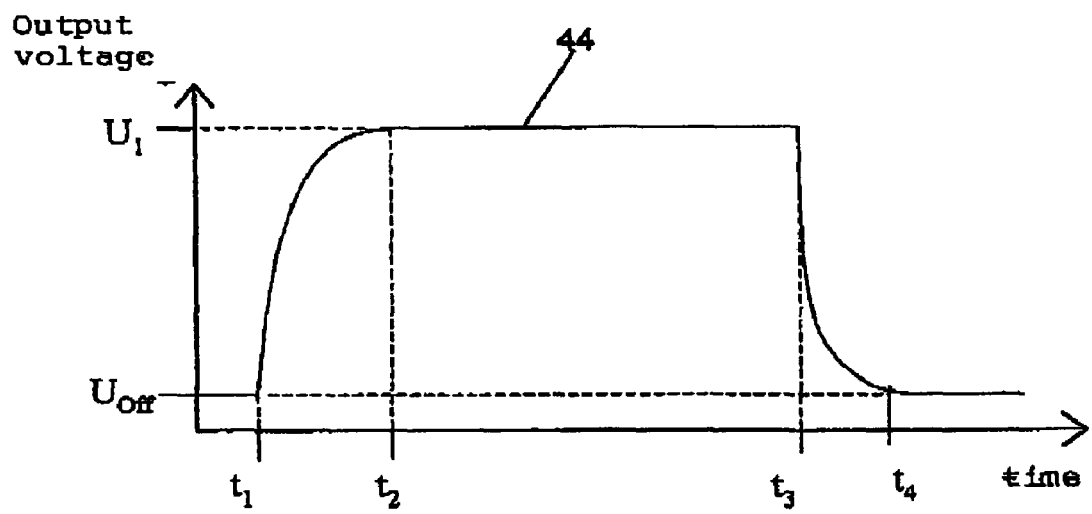
FIG. 3 is a graph of a typical output signal of the flow rate sensor.

A typical output signal waveform 44 of the sensor 42 is illustrated in FIG. 3: before the activation time $t_1$ of the dispenser 30, the sensor output voltage has a specific offset voltage $U_{Off}$. This is compensated by the digital signal processor control 10 and taken into account when the actual flow rate is determined.

After the dispenser 30 has been switched on at time $t_1$, the signal voltage rises to a voltage $U_1$ which is reached at time $t_2$ and remains approximately constant while the flow rate is continuous. At time $t_3$, the dispenser 30 is switched off. Even though no more fluid leaves the dispenser 30, the flow of fluid in the system does not stop abruptly, but rather a small amount of fluid still passes the sensor 42 and is detected by the sensor until time $t_4$. $t_4$ is the time at which the sensor reaches the initially determined offset voltage $U_{off}$. This overrun amount depends on the type of fluid, the overall construction of the system and in particular the flow rate. The flow rate is in turn particularly dependent on the control frequency of a piezo dispenser as well as from the pressure on the fluid. This overrun amount forms a part of the overall quantity of the dispensed fluid and thus has to be taken into account.

The overrun characteristic mentioned above determines how great the quantity is of overrun fluid measured by the sensor 42 after the dispenser 30 has been switched off. The overrun quantity is determined by integration after the dispenser has been switched off. The integration starts at time $t_3$ and ends at $t_4$. The overrun characteristic is dependent on the fluid carrying components of the dispenser system (hoses, dispenser etc), on the compressibility of the fluid and in particular on the flow rate. The flow rate in turn is particularly dependent on the frequency at which a piezo dispenser is operated or on the pressure under which a pressurized dispenser works.

The overrun characteristic 54 is determined by several (approx. 10) individual dosing tests at different flow rates from the amount of overrun ascertained each time. To approximate the overrun characteristic 54, a polynomial of the 3rd degree or the sum of two e-functions is preferably used.

To prevent too large a quantity of fluid from being delivered, in determining the switch-off point of the dispenser 30, account is taken, alongside the continuously determined overall quantity of the fluid dispensed, of the overrun characteristic as a function of the output frequency and/or flow rate. If, for example, at a constant flow rate and an overall quantity of fluid measured at 10.0 mg, the dispenser 30 is switched off, a specific quantity of fluid will still be detected by the sensor 42 after the dispenser 30 has been switched off, assumed to be approximately 0.04 mg. This subsequently detected quantity is entered in a table so that at a constant flow rate, the dispensing process will be terminated at a measured quantity of 9.96 mg in order to obtain an overall quantity of 10.0 mg. This means that before the required overall quantity of fluid has been reached, the dispensing process is switched off in good time depending on the overall quantity already attained and the dispensing rate.

Figure 4:
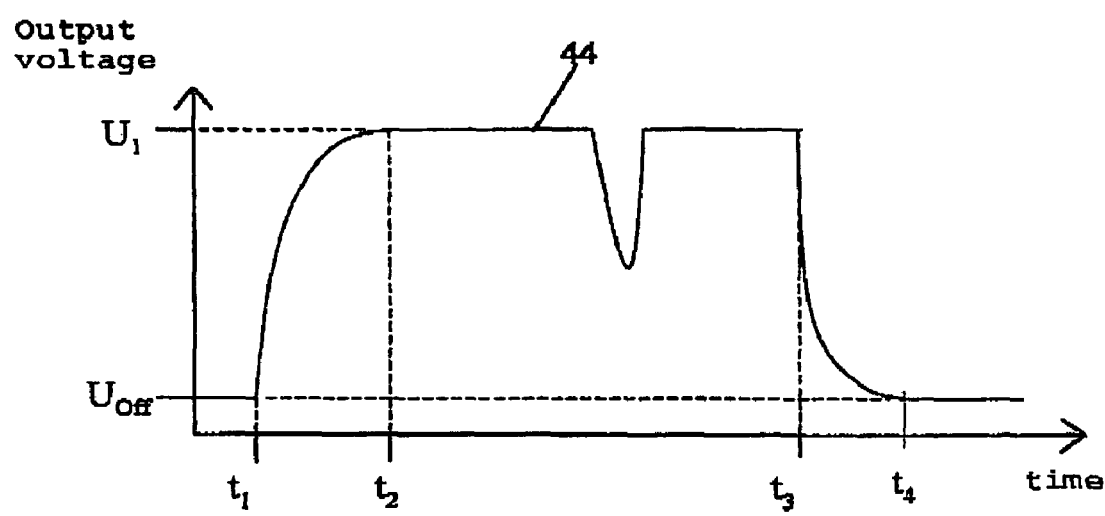
FIG. 4 is a graph of a typical output signal of the flow rate sensor when a failure occurs (air trapped in the fluid)

On the basis of a change in the flow rate beyond predetermined limits, it is also possible for the digital signal processor control 10 to recognize a failure condition, such as air being trapped in the fluid feed line, as illustrated in FIG. 4. Air trapped in this way becomes noticeable by a momentary fall in the output signal 44 of the sensor. The digital signal processor control can measure and compensate such a situation or generate an appropriate failure message.

IDENTIFICATION REFERENCE LIST

10 Digital signal processor control
12 Input signal (start signal)
14 Input signal (predetermined dosage)
16 Output signal (dispenser control)
18 Key pad
20 Interface
22 Display
24 DSP (digital signal processor)
26 Superordinate control
28 Storage unit
30 Dispenser
32 Reservoir
34 Line system
36 Interface
40 Sensor unit
42 Flow rate sensor
44 Output signal (sensor)
46 Pre-amplifier
48 Storage unit ((E)EPROM)
50 Interface
52 Sensor characteristic
54 Overrun characteristic

The invention claimed is:

1. A dosing system to dispense a predetermined quantity of a fluid medium comprising,
   a control (10) having an interface (16; 50) to emit control signals, an interface to measure at least one sensor signal, and a storage unit (28) to store an overrun characteristic (54),
   a dispenser (30) for the fluid, which, controlled by control signals transmitted via the interface (16), dispenses a specific quantity of fluid,
   a sensor unit (40) having a flow rate sensor (42);
   wherein the quantity of fluid to be dispensed by the dispenser (30) is continuously measured by the control (10) with the aid of the flow rate sensor (42), and as a function of this and the overrun characteristic (54) the overrun characteristic determining the amount of fluid still sensed by the flow rate sensor after the dispenser is switched off, the quantity of fluid to be dispensed by the dispenser (30) is regulated such that it corresponds to the predetermined quantity of fluid.

2. A dosing system according to claim 1, characterized in that the control (10) is realized by means of a digital signal processor control or a micro-processor control.

3. A dosing system according to claim 1, characterized in that the fluid to be dispensed is led from a reservoir (32) via a line system (34) to the dispenser (30), the flow rate sensor (42) as part of the sensor unit (40) being connected in the line system (34).

4. A dosing system according to claim 3, characterized in that the flow rate sensor (42) operates according to the differential temperature principle or any other rapid, high-precision flow rate sensor principles.

5. A dosing system according to claim 1, characterized in that the sensor unit (40) comprises the flow rate sensor (42), a pre-amplifier (46) to amplify the analogue output signals of the sensor (42) and a storage unit (48) in which the calibration characteristic of the sensor (42) is filed either as a truth table or in the form of a mathematical function.

6. A dosing system according to claim 1, characterized in that the control (10) has an analogue or digital interface (20) to send measured values to a superordinate control (26).

7. A dosing system according to claim 6, characterized in that a display (22) for the visualization of the input and output data is connected to the control (10) or to the superordinate control (26).

8. A dosing system according to claim 1, characterized in that the control (10) comprises a DSP 24.

9. A process for the dosage of a predetermined quantity of a fluid medium,
   characterized in that
   during the dosing process the quantity of fluid to be dispensed by a dispenser (30) is continuously measured by a control (10) with the aid of a flow rate sensor (42), and as a function of this and an overrun characteristic (54) which is filed in a storage unit of the control, the overrun characteristic determining the amount of fluid still sensed by the flow rate sensor after the dispenser is switched off, the quantity to be dispensed by the dispenser (30) is regulated such that it corresponds to the predetermined quantity of fluid.

10. A process according to claim 9, characterized in that the quantity of fluid to be dispensed by the dispenser (30) is regulated as a function of the measured flow volume.

11. A process according to claim 9, characterized in that from a sensor signal (44) emitted by the flow rate sensor (42), the flow rate given by the weight or the volume per unit of time, is determined by the control (10) on the basis of a sensor characteristic (52) stored in a storage unit (48).

12. A process according to claim 11, characterized in that the determination of the actual flow rate by the control (10) is done at specific time intervals according to a specific sampling rate of the sensor signal (44), the overall flow volume of the fluid being determined by the integration of the individual measured values of the flow rate taking the sampling rate into account.

13. A process according to claim 9, characterized in that the dosing process is triggered by an external start signal (12).

14. A process according to claim 9, characterized in that a predetermined value (14) for the quantity of fluid to be dosed is fed to the control (10) from outside or entered directly via an interface.

15. A process according to claim 9, characterized in that the control (10) provides an electronic control unit of the dispenser (30) with other parameters and values such as temperature, dispensing/drop rate or with commands such as on/off, via an analogue or digital interface (36) or data lines.

16. A process according to claim 11, characterized in that the sensor signal (44) of the flow rate sensor (42) is pre-amplified and fed to the control (10) via an analogue interface.

17. A process according to claim 9, characterized in that while continuously measuring the amount of fluid dispensed, the control (10) records any dead-time or overshoot effects of the fluid-carrying system.

18. A process according to claim 9, characterized in that the overrun characteristic is read out by the control (10) when the system is started up.

19. A process according to claim 9, characterized in that the overrun characteristic (54) is continuously taken into account during the dispensing process and the dispensing process is stopped in good time when the predetermined quantity of fluid to be dispensed has been reached.

20. A process according to claim 9, characterized in that the overrun characteristic (54) is determined as a function of the flow rate.

21. A process according to claim 9, characterized in that in determining the switch-off point of the dispenser (30), account is taken, alongside the continuously determined overall quantity of the dispensed fluid, of the overrun quantity determined by the overrun characteristic (54) as a function of the flow rate.

22. A process according to claim 9, characterized in that the dosing process is terminated at a time $t_3$, at which the overall quantity of dispensed fluid ascertained is the same as the required overall quantity less the overrun quantity.

23. A process according to claim 9, characterized in that the integration of the flow rate to determine the overall quantity is completed by time $t_4$.

24. A dosing system to dispense a predetermined quantity of a fluid medium comprising,
   a control (10) having an interface (16; 50) to emit control signals, an interface to measure at least one sensor signal, and a storage unit (28) to store an overrun characteristic (54),
   a dispenser (30) for the fluid, which, controlled by control signals transmitted via the interface (16), dispenses a specific quantity of fluid,
   a sensor unit (40) having a flow rate sensor (42);
   wherein the quantity of fluid to be dispensed by the dispenser (30) is measured by the control (10) with the aid of the flow rate sensor (42), and as a function of this and the overrun characteristic (54), the overrun characteristic determining the amount of fluid still sensed by the flow rate sensor after the dispenser is switched off, the quantity of fluid to be dispensed by the dispenser (30) is regulated such that it corresponds to the predetermined quantity of fluid.

* * * * *